United States Patent
Tsuchiya et al.

(10) Patent No.: US 6,249,837 B1
(45) Date of Patent: *Jun. 19, 2001

(54) MEMORY WITH PLURALITY OF BLOCKS EACH ACCESSED SELECTIVELY WITH EITHER ONE OF TWO OPERATIONAL MODES TO REDUCE CURRENT DISSIPATION USING VALUES OF REGISTER BITS SET BY AN INSTRUCTION SIGNAL

(75) Inventors: Masahiro Tsuchiya; Masaru Sugai; Hiroyuki Kida, all of Hitachi (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,114

(22) Filed: Oct. 24, 1997

(30) Foreign Application Priority Data

Oct. 29, 1996 (JP) .................................................. 8-286411

(51) Int. Cl.⁷ .................................................... G06F 12/00
(52) U.S. Cl. .......................... 711/100; 711/101; 711/154; 711/170; 711/173
(58) Field of Search ............................ 711/101–122, 154, 711/170, 173; 365/185–230; 710/129

(56) References Cited

U.S. PATENT DOCUMENTS

| 4,604,727 | * | 8/1986  | Shah et al. ............... 365/189.01 |
| 4,912,679 | * | 3/1990  | Shinoda et al. ............ 365/230.01 |
| 4,918,586 | * | 4/1990  | Niimura et al. ................. 711/102 |
| 4,926,382 | * | 5/1990  | Sakui et al. ...................... 365/203 |
| 4,933,907 | * | 6/1990  | Kumanoya et al. ............. 365/222 |
| 5,014,246 | * | 5/1991  | Komatsu et al. .......... 365/230.03 |
| 5,113,511 | * | 5/1992  | Nelson et al. ................... 711/104 |
| 5,280,589 | * | 1/1994  | Nakamura ....................... 710/129 |
| 5,426,755 | * | 6/1995  | Yokouchi et al. .............. 711/101 |
| 5,455,795 | * | 10/1995 | Nakao et al. ............... 365/189.05 |
| 5,530,384 | * | 6/1996  | Lee et al. ........................... 327/51 |
| 5,541,879 | * | 7/1996  | Suh et al. .................... 365/185.22 |
| 5,623,452 | * | 4/1997  | Lee ............................. 365/230.05 |
| 5,717,649 | * | 2/1998  | Kim et al. .................. 365/230.06 |
| 5,748,555 | * | 5/1998  | Park ............................ 365/230.04 |
| 5,828,869 | * | 10/1998 | Johnson et al. ................. 713/501 |

FOREIGN PATENT DOCUMENTS 6-259986    9/1994    (JP) .

* cited by examiner

Primary Examiner—Meng-Al T. An
Assistant Examiner—Nabil El-Hady
(74) Attorney, Agent, or Firm—Antonelli, Terry, Stout & Kraus, LLP

(57) ABSTRACT

A memory is configured such that two operational modes, including a high-speed access mode in which current dissipation amount is large, but a high-speed access is possible, and a small current mode in which an access speed is lower than that in said high-speed access mode, but the current dissipation amount is small, are provided in the memory. The memory includes a control circuit for executing one of the two operational modes for the memory, in accordance with a mode designation signal sent from the outside of the memory.

3 Claims, 7 Drawing Sheets

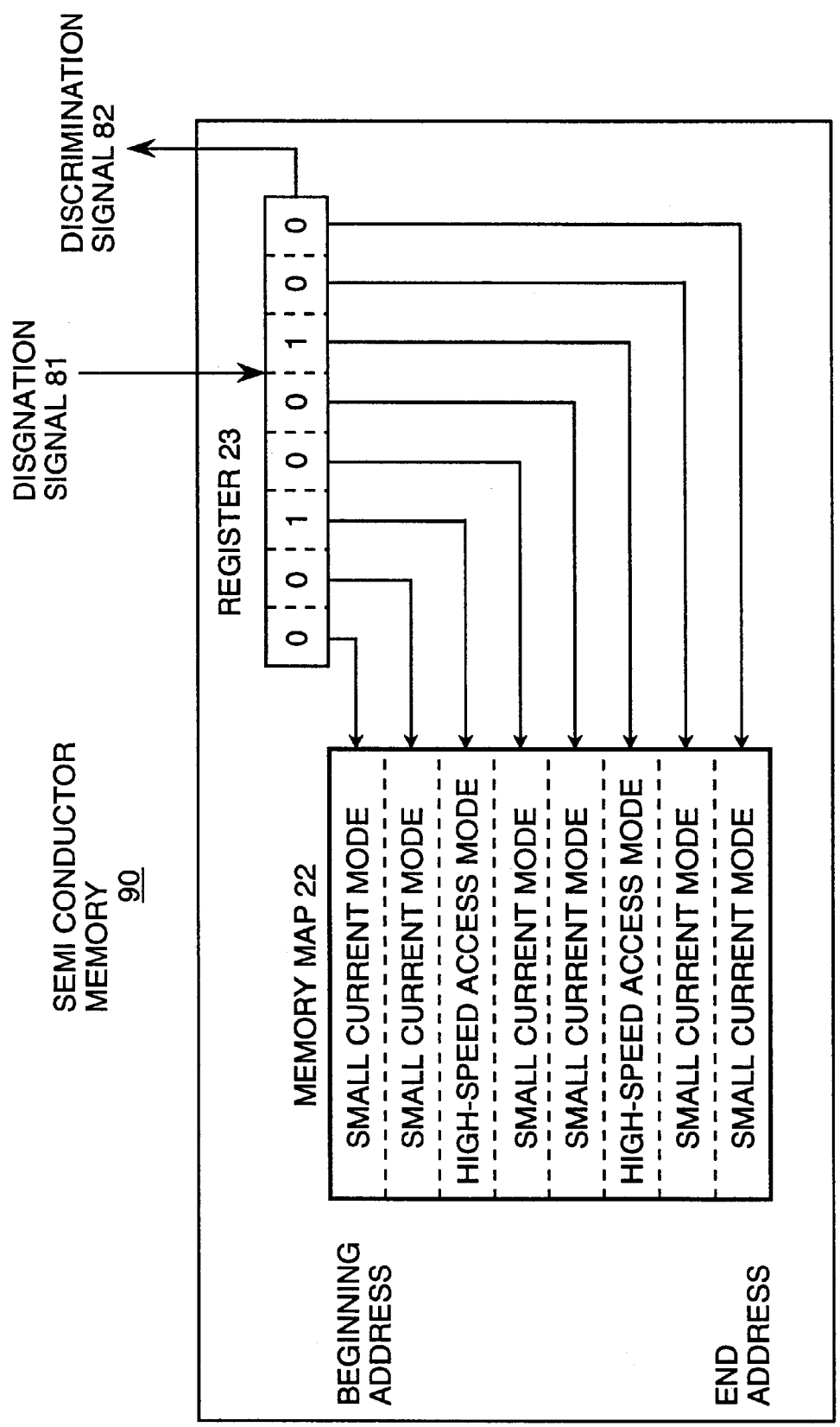

MEMORY WITH PLURALITY OF BLOCKS EACH ACCESSED SELECTIVELY WITH EITHER ONE OF TWO OPERATIONAL MODES TO REDUCE CURRENT DISSIPATION USING VALUES OF REGISTER BITS SET BY AN INSTRUCTION SIGNAL

BACKGROUND OF THE INVENTION

The present invention relates to a memory and a microcomputer including the memory; and more especially, the invention relates to a composition of the memory and the microcomputer in which the amount of current dissipation is reduced.

Generally, in the case where a processor using a memory has a high-speed processing mode and a low-speed processing mode, a memory having a high-speed access operation is used to accommodate the high-speed processing mode of the microcomputer. That is, even if the microcomputer operates in the low-speed processing mode, the memory maintains its maximum operational speed. Therefore, the conventional memory works at its maximum operational speed and consumes a current proportional to the number of switching operations performed in the memory, even when it is possible for the memory to operate at a lower operational speed. This operational feature of the memory impedes a reduction of current dissipated in the memory or the processor using it.

Although a single chip microcomputer capable of operating in either a high-speed processing mode or a low-speed processing mode is disclosed in JP-A-259986/1994, its mode changing method is different from the present invention, and it does not have the ability to directly control the memory access speed of its memory.

SUMMARY OF THE INVENTION

An object of the present invention is to provide a memory and a microcomputer which are effective to reduce the current dissipated in the memory and the microcomputer.

One feature of a memory according to the present invention is that the memory has a high-speed access mode in which the memory access speed is high, but the current dissipation amount is large, and a small current mode in which the memory access speed is lower than that in the high-speed access mode, but the current dissipation amount is small.

Another feature of the memory having a high-speed access mode in which the memory access speed is high, but the current dissipation amount is large, and a small current mode in which the memory access speed is lower than that in the high-speed access mode, but the current dissipation amount is small, is that the memory further includes a control circuit for controlling the memory to operate either in the high-speed access mode or in the small current mode in accordance with a commend received from outside of the memory.

Another feature of the memory having a high-speed access mode in which the memory access speed is high, but the current dissipation amount is large, and a small current mode in which the memory access speed is lower than that in the high-speed access mode, but the current dissipation amount is small, is that the memory further includes a control circuit for controlling each memory block, established by dividing the address space of the memory into a plurality of memory blocks, to operate either in the high-speed access mode or in the small current mode in accordance with a command received from outside of the memory.

Still another feature of the memory according to the present invention is that the address space of the memory is divided into at least two regions including a high-speed access operating region in which the memory access speed is high, but the current dissipation amount is large, and a small current operating region in which the memory access speed is lower than that in the high-speed access mode, but the current dissipation amount is small, and the memory further includes a control circuit for switching the operational state for each of the regions to an active state or an inactive state in accordance with a command received from outside of the memory.

Furthermore, a microcomputer to attain the above object of the present invention includes one of the abovementioned features.

In accordance with the present invention, the dissipation current in a memory and a microcomputer can be reduced by operating the memory in the small current mode during a period in which high-speed memory access is not required.

BRIEF DESCRIPTION OF THE DRAWINGS

FIG. 4 is a diagram which shows an example of the implementation of the feature shown in FIG. 3.

DETAILED DESCRIPTION OF THE EMBODIMENTS

Hereinafter, various embodiments according to the present invention will be explained with reference the drawings.

First of all, a basic concept of the present invention will be explained with reference to FIG. 1.

Figure 1:
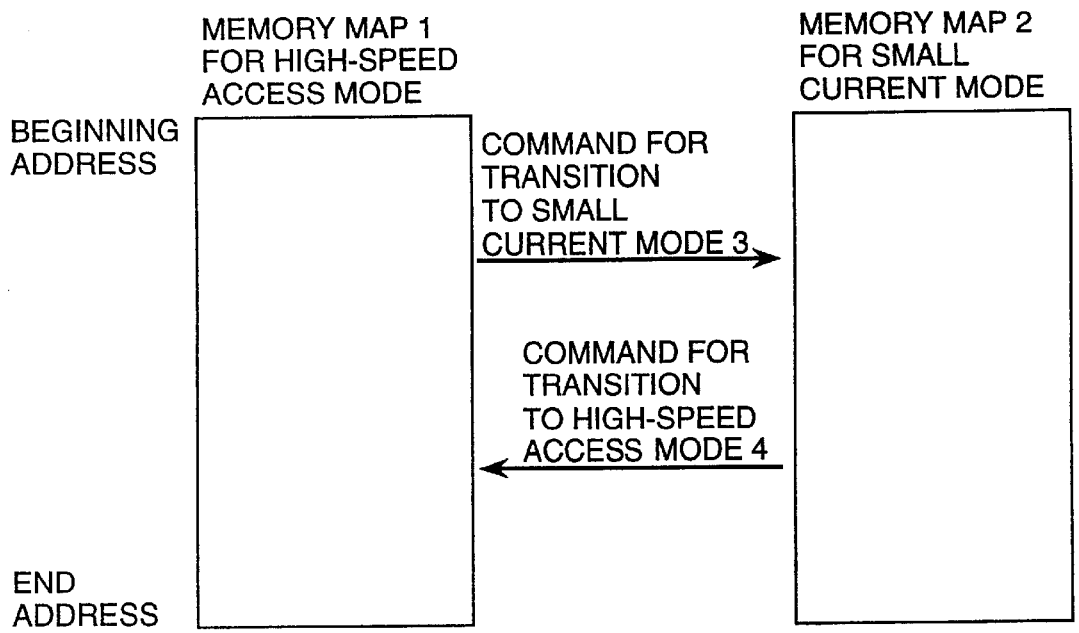
FIG. 1 is a diagram which conceptually shows the operation of a memory according to the present invention.

FIG. 1 is a diagram which conceptually shows the operation of a memory according to the present invention. In this embodiment, the memory is composed so that it has a high-speed access mode (a high-speed access and large current operation mode 1) shown as a high-speed access and large current operation mode memory map 1 (the memory access speed is high, but the amount of current dissipation is large), and a small current mode (a low-speed access and small current operation mode 2) shown as a low-speed access and small current operation mode memory map 2 (the memory access speed is low, but the amount of current dissipation is small). Furthermore, the mode is selected in accordance with a command for transition to the high-speed access mode or a command for transition to the small current mode.

That is, the memory according to the present invention includes a designation means for designating in the operation of the memory accordance with a command 3 for transition to the small current mode 2 or a command 4 for transition to the high-speed access mode 1, a switching means for selecting either the small current mode 2 in response to the designated command 3 for transition to the small current mode 2 or the high-speed access mode 1 in response to the designated command 4 for transition to the high-speed access mode 1. By including these means, the memory can provide a function by which switching of the operational state between a high-speed operational state and low-speed operational state becomes possible, and unnecessary current dissipation also can be reduced.

As mentioned above, a main feature of the memory according to the present invention is that the memory includes a control means which controls operation of the memory either in the high-speed access mode 1 in which the memory is accessible at a high speed, but in which the amount of current dissipation is large, or in the small current mode 2 in which the amount of current dissipation is small, but the access speed is lower than that of the mode 1, that is, to select the mode 1 or the mode 2, in accordance with a command for transition to the mode 1 or the mode 2, received from the outside of the memory. As an example of the control means (mode selection means), the circuits 32 and 33 in FIG. 2 are relevant.

Figure 2:
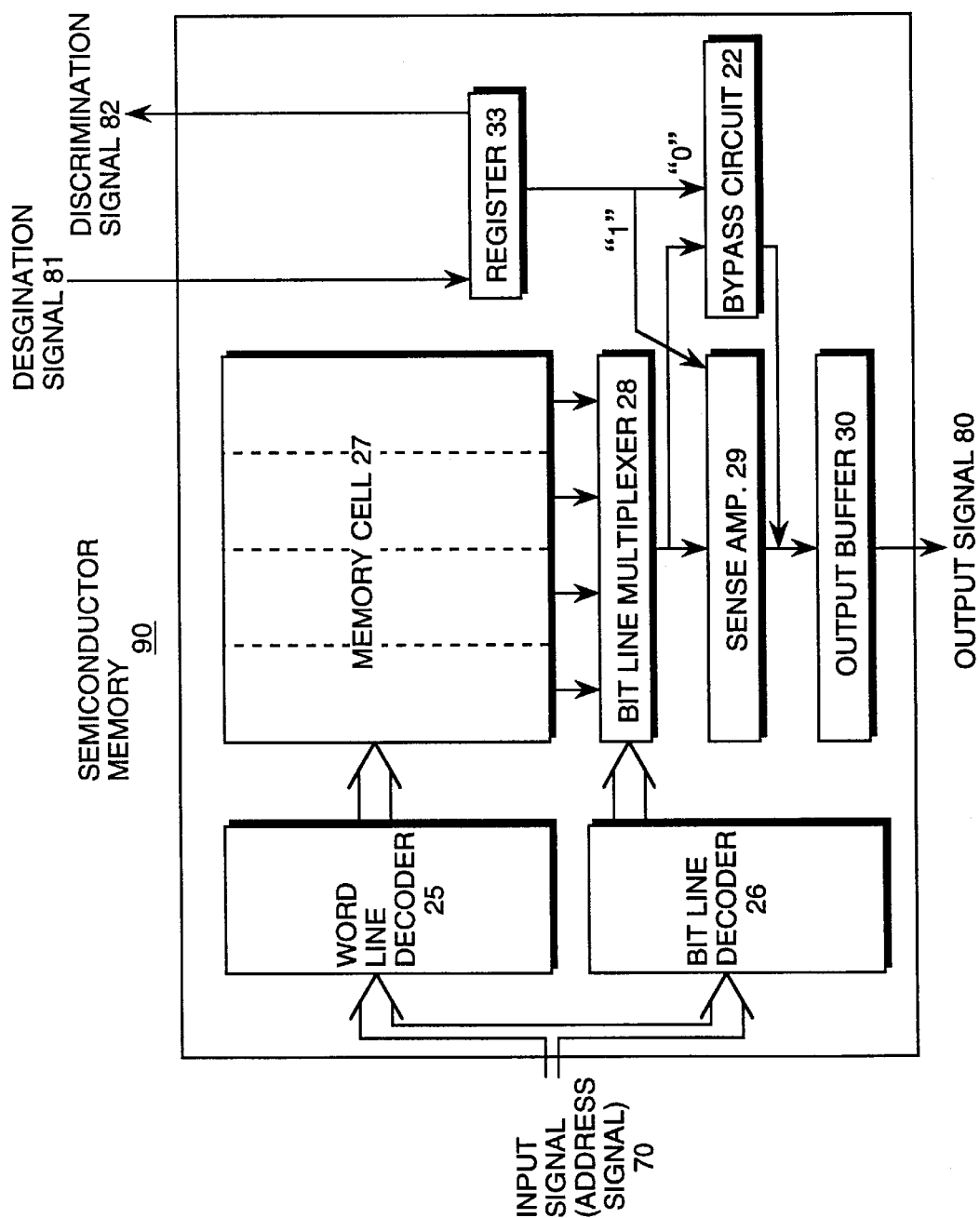
FIG. 2 is a block diagram which shows an example of a semiconductor memory using the concept shown in FIG. 1.

FIG. 2 is a block diagram which shows an example of a semiconductor memory which employs the basic concept of the invention as shown in FIG. 1. That is, the mode selection means is implemented by use of the circuit (register) 33. In this figure, elements indicated by numerals 25–30 are elements used in a conventional memory, and the circuits 22 and 33 are newly added to the memory in accordance with the present invention.

If a designation signal 81 indicates the command 3 for transition to the small current mode, a first value, for example, "0", is set into the register 33, and if the designation signal 81 indicates the command 4 for transition to the high-speed access mode, a second value, for example, "1", is set into the register 33. Furthermore, if the content of the register 33 is designated as the high-speed access mode (the value of the register 33 is the second value, that is, "1"), a sense amplifier 29 operates and a bypass circuit 22 does not operate.

In the high-speed access mode of the semiconductor memory 90, similar to a conventional memory, an address signal 70 input from the outside of the memory is decoded by a word line decoder 25, and a corresponding signal line of a memory cell 27 is selected in accordance with the decoded address signal. Through the signal line, a data signal of one word is sent to a bit line multiplexer 28. Moreover, a bit line decoder 26 decodes the address signal 70, and the bit line multiplexer 28 sends the data signal output from the memory cell 27 to the sense amplifier 29, based on the decoded address signal. The sense amplifier 29, in which the amount of current dissipation is large, amplifies the received data signal and sends it to an output buffer 30. The output buffer 30 outputs the data signal to the outside of the memory.

If the content of the register 33 is designated as the small current mode (the value of the register 33 is the second value, that is, "0"), the operation of the sense amplifier 29 is inhibited, and a data signal output from the memory cell 27 in response to an address signal is directly sent to the output buffer 30 from the bit line multiplexer 28 via the bypass circuit 22 by operating the bypass circuit 22. Since the sense amplifier 29 which dissipates a large amount of current is not operated during the small current mode, the access time of the memory is low, but the amount of current dissipation amount is small.

Furthermore, by providing a confirmation means for reading out a register signal, namely, the value of the register 33, as a confirmation signal 82, it is possible to confirm in which mode the memory is being operated. The confirmation means also can be provided outside the register 33. By using the confirmation means, it becomes possible to change the computing speed in synchronism with the selected memory access speed, as will be explained in more detail later. It is also possible to provide the register 33 outside of the memory.

Figure 3:
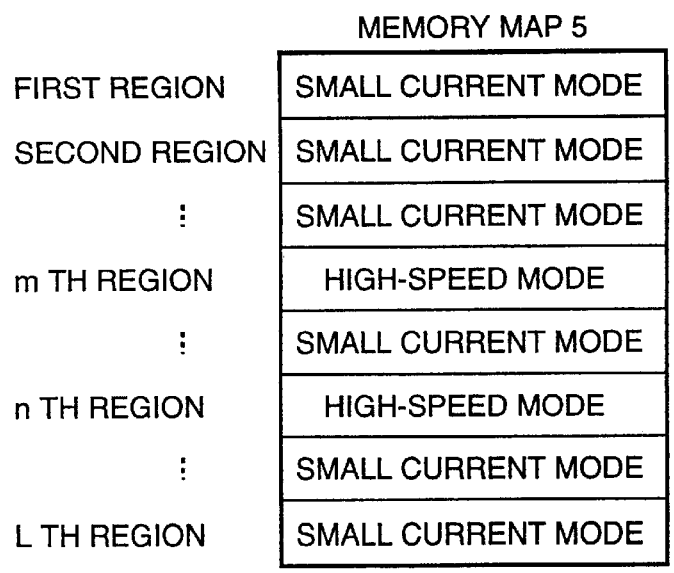
FIG. 3 is a diagram which conceptually shows another feature of the operation of a memory according to the present invention.

FIG. 3 is a diagram which conceptually shows a further feature of the operation of a memory according to the present invention. In this case, the memory is configured so that it can operate in the high-speed access mode or the small current mode, as described with reference to FIGS. 1 and 2, and it is possible to select which of the two operational modes (the high-speed access mode or the small current mode) is to be employed for each of a plurality of memory blocks, which are defined by dividing the address space of the memory. That is, the memory has a circuit arrangement to operate either in the high-speed access mode or the small current mode, and a designation circuit (anyone of a physical means or a logical means is applicable) provided in or outside the memory selects one of the two operational modes for each of the plurality of memory blocks in the address space of the memory. Thus, one of the two operational modes is assigned to "each of the memory blocks" based on a designation signal which is sent from the outside of the memory, and each memory block is operated in accordance with its mode assignment.

In the illustrated example of the memory blocks, the number of the memory blocks is L, the m-th and the n-th blocks are operated in the high-speed access mode, and the other blocks are operated in the small current mode. The capacity of each memory block can be equal or different from each other. As mentioned above, this feature of the memory according to the present invention permits the memory to be operated in the high-speed access mode in which the access speed is high, but in which the amount of current dissipation is large, or in the small current mode in which the access speed is lower than that of the former mode, but in which the amount of current dissipation is small, and in which the mode of operation is selected and executed in accordance with a designation signal sent from the outside of the memory to establish which of the two operational modes is employed for each of a plurality of memory blocks which are determined by dividing the address space of the memory. By using memory control, since a user can decide how to divide the memory into memory blocks and assign one of the two modes to each memory block, the advantage of being able to more flexibly employ a program is obtained.

A main and basic feature of the memory according to the present invention as exemplified in FIGS. 1 through 3, is that it can operate in the high-speed access mode in which the access speed is high, but in which the amount of current dissipation is large, or in the small current mode in which the access speed is lower than that of the former mode, but in which the amount of current dissipation is small.

FIG. 4 is a diagram which shows an example of a semiconductor memory which operates in the manner described with reference to FIG. 3. In FIG. 4, the individual memory blocks can be accessed selectively in either the high-speed access mode or the small current mode by allocating each bit of a register 23 to a respective one of the plurality of memory blocks which are established by dividing the address space of the memory, and by designating the value of each bit according to the operational mode to be assigned to each memory block. That is, by using the register 23 as a circuit to select one of the two operational modes for each memory block, an operational mode pattern of the memory blocks, as shown in FIG. 3, is established.

In FIG. 4, the relationship between each bit of the register 23 and each memory block is shown. In this example, the memory is divided into eight blocks, and the eight bits of the register 23 are allocated respectively to the eight memory blocks. Furthermore, if the value of a bit in the register 23 is the first value, that is, "0", the corresponding memory block is operated in the small current mode, and if the value of a bit in the register is the second value, that is, "1", the corresponding memory block is operated in the high-speed access mode. A relationship between each bit of the register 23 and each memory block, which is reverse to the illustrated example, is of course possible as well. Moreover, by providing a means for reading out the contents of the register 23 as a discrimination signal 82 to the outside of the memory, it can be confirmed which operational mode is being used for each memory block.

Figure 5:
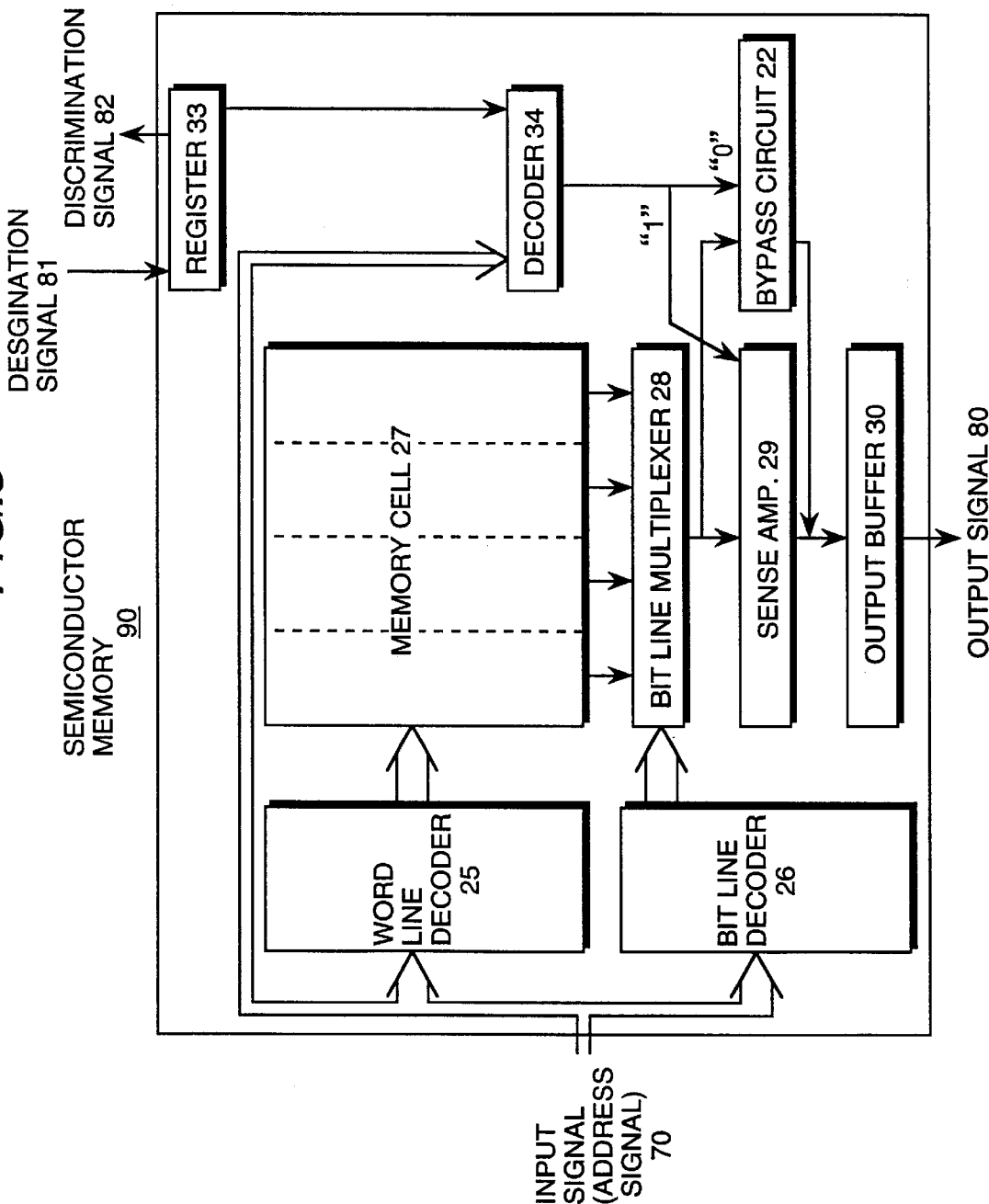
FIG. 5 is a block diagram which shows an example of a semiconductor memory incorporating the features shown in FIG. 2 and in FIG. 4.

FIG. 5 is a block diagram which shows a more detailed example of the semiconductor memory which embodies the features shown in FIG. 2 and FIG. 4. In this figure, elements indicated by numerals 25–30 are elements used in a conventional memory, and the circuits 22, 33 and 34 are newly added in the memory according to the present invention.

First of all, the decoder 34 decodes necessary bits of the input address signal 70 (the upper three bits if the number of the memory blocks is 8), and collates the value of the decoded bits with the value of a corresponding bit of the register 33. If the value of the corresponding bit is the second value, that is, "1", it is determined that a corresponding memory block is to be operated in the high-speed access mode, operation of the bypass circuit 22 is inhibited and the sense amplifier 29 is operated.

As mentioned above, in this embodiment, in the high-speed access mode in the semiconductor memory 90, similar to a conventional memory, the address signal 70 input from the outside of the memory is decoded by the word line decoder 25, and a corresponding signal line of the memory cell 27 is selected in accordance with the decoded address signal. Through a data signal line a data signal of one word is sent to the bit line multiplexer 28. Moreover, the bit line decoder 26 decodes the address signal 70, and the bit line multiplexer 28 sends the data signal received from the memory cell 27 to the sense amplifier 29, based on the decoded address signal. The sense amplifier 29, in which the amount of current dissipation is large, amplifies the data signal and sends it to the output buffer 30. The output buffer 30 outputs the data signal to the outside of the memory.

On the other hand, in the same process as that mentioned above, the decoder 34 decodes the necessary bits of the input address signal 70 and collates the value of the decoded bits with the value of a corresponding bit of the register 33. As a result, if the value of the bit which corresponds to the decoded and identified memory block, in the register 33, designates the small current mode (the value of the register 33 is the second value, that is, "0"), the operation of the sense amplifier 29 is inhibited, a the data signal outputted from the memory cell 27 in response to the address signal is directly sent to the output buffer 30 from the bit line multiplexer 28 via the bypass circuit 22 by operating the bypass circuit 22. Since the sense amplifier 29 which dissipates a large amount of current is not operated in the small current mode, the access time of the memory is low, but the amount of current dissipation also is small.

Figure 6:
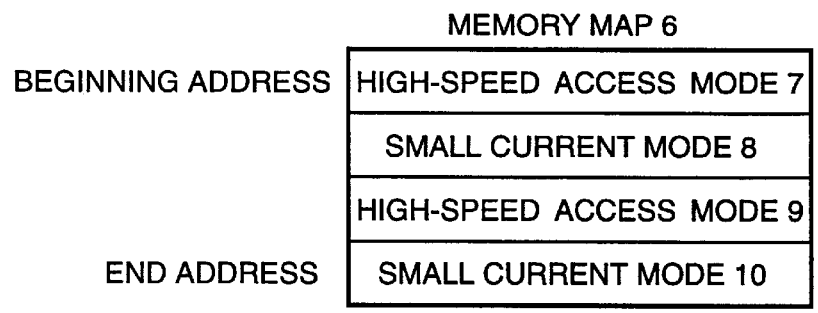
FIG. 6 is a diagram which conceptually shows another feature of the operation of a memory according to the present invention.

FIG. 6 is a diagram which conceptually shows another possible operation of a memory according to the present invention. In this embodiment, the memory is controlled so that it can operate in the high-speed access mode or the small current mode, and one of these two operational modes is assigned and fixed to each of the plurality of memory blocks which are established by dividing the address space of the memory. That is, the memory is operated so that the high-speed access mode is set for the memory blocks 7 and 9, and the small current mode is set for the memory blocks 8 and 10. However, as to the group of memory blocks to be operated in the high-speed access mode and the group of memory blocks to be operated in the small current mode, the number of blocks in each group can be freely set, and the size of each memory block and the order of the memory blocks also can be arbitrarily set. However, in this embodiment, there is no capability to change the respective operational modes already set for the respective memory blocks.

In this embodiment, it is not necessary to provide a circuit for inputting a signal, sent from the outside of the memory, to change the operational modes, or to provide a register for storing such a signal. Therefore, the circuit size of the memory is reduced, and the amount of current dissipation is also reduced according to the reduced circuit size.

Figure 7:
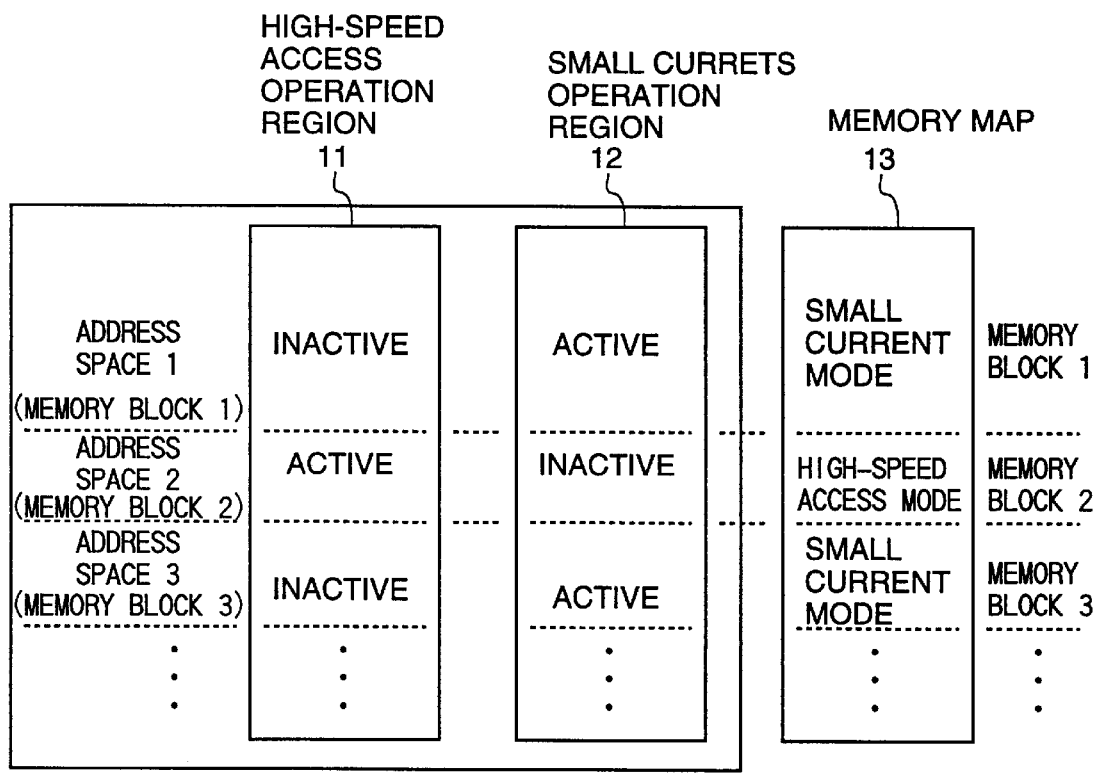
FIG. 7 is a diagram which conceptually shows another feature of the operation of a memory according to the present invention.

FIG. 7 is a diagram which conceptually shows another manner of operation of a memory according to the present invention. In this embodiment, the memory is divided into a high-speed access operation region 11 (high-speed access and large current region) and a small current operation region 12 (low-speed access and small current region), each of which is further divided into a plurality of memory blocks, the respective memory blocks of one region being virtually composed at the same address subspace as the respective blocks of the other region.

Furthermore, each address subspace is designated by the memory map 13 for which region is to be used. That is, the memory is composed so that the high-speed access operation region 11 and the small current operation region 12 are set, and each region is divided into memory blocks at the same address subspace, each memory block being designated to be active or inactive by the memory map 13, i.e., each address subspace is designated for which operation region to be used. This embodiment is equivalent to an extension of the embodiment of FIG. 3.

In this embodiment, it is possible to optimize the operational performance of each operation region of the memory. That is, it is possible to use the memory most efficiently.

Figure 8:
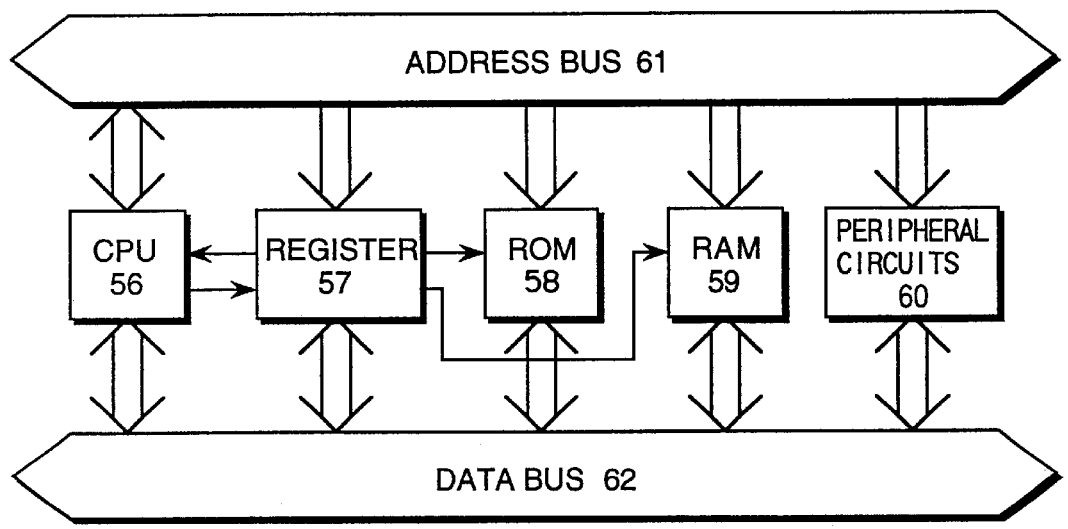
FIG. 8 is a block diagram which shows a microcomputer incorporating features of the present invention.

FIG. 8 is a block diagram which shows a microcomputer embodying the features according to the present invention. In this regard, a single-chip microcomputer is shown by way of example, and it is composed of CPU56, ROM58, RAM59, a register 57 for switching the operation modes in the memories, a peripheral circuit 60, an address bus 61 and a data bus 62. The register 57 has a function to control the operation mode in the RAM 59 and/or ROM 58 between the high-speed access mode and the small current mode. Furthermore, it is possible for CPU 56 also to be operated so as to have two processing modes corresponding to a high-speed access mode and a small current mode in the use of the memories.

In the microcomputer according to the present invention, since the register 57 can be commonly used for ROM 58 and RAM 59, the composition of the microcomputer can be simplified.

As mentioned above, in a microcomputer system in which the memory control according to the present invention is employed so that the memory can be operated in the high-speed access mode or the small current mode, the microcomputer is also configured so that it can be operated in a high-speed processing mode or a low-speed processing mode as well. When the microcomputer is operated in the high-speed processing mode, it automatically outputs a command to the memory for transition to the high-speed access mode, and the memory receiving the command automatically switches its operation mode to the high-speed access mode. On the other hand, when the microcomputer is operated in the low-speed processing mode, it automatically outputs a command to the memory for transition to the small current mode, and the memory receiving the command automatically switches its operation mode to the small current mode.

That is, high-speed and low-speed processing modes are provided in the microcomputer, and the microcomputer outputs a command for selecting one of two operation modes to the memory, the command being a command for transition to the high-speed access mode, if the microcomputer is operated in the high-speed processing mode, and a command for transition to the small current mode, if the microcomputer is operated at the low-speed processing mode. The signal for selecting one of the processing modes in the microcomputer can be commonly used for selecting one of the operation modes in the memory. Therefore, the circuit size of the memory can be reduced, and the amount of current dissipation is also thereby reduced according to the reduced circuit size.

As a further feature of the present invention, in a microcomputer system in which the memory according to the present invention is combined with a microcomputer, and wherein the memory is composed so that it can be operated in a high-speed access mode or a small current mode, and wherein the microcomputer is also composed so that it can be operated at a high-speed processing mode or a low-speed processing mode, when an access is executed to a memory region set for the high-speed access mode, a command for transition to the high-speed processing mode may be automatically sent to the microcomputer by a selecting means, such as a register setting means, so that the microcomputer receiving this command automatically switches its operation mode to the high-speed processing mode. On the other hand, when an access is executed to a memory region set for the small current mode, a command for transition to the small current mode is automatically set to the microcomputer, for example, by a register setting means, and the microcomputer receiving the command automatically switches its operation mode to the low-speed processing mode.

That is, the feature of this arrangement is that high-speed and low-speed processing modes are provided in the microcomputer, and the microcomputer further includes a means responsive to a command for selecting one of the two processing modes in the microcomputer, which command is automatically sent from the memory to the microcomputer itself, the command being a command for transition to the high-speed processing mode, if an access is executed to a memory region set at the high-speed access mode, and a command for transition to the low-speed processing mode, if an access is executed to a memory region set at the small current mode. In this way, it is not necessary to generate a command in the microcomputer for switching the processing modes of the microcomputer. Therefore, the software for the microcomputer can be simplified.

Figure 9:
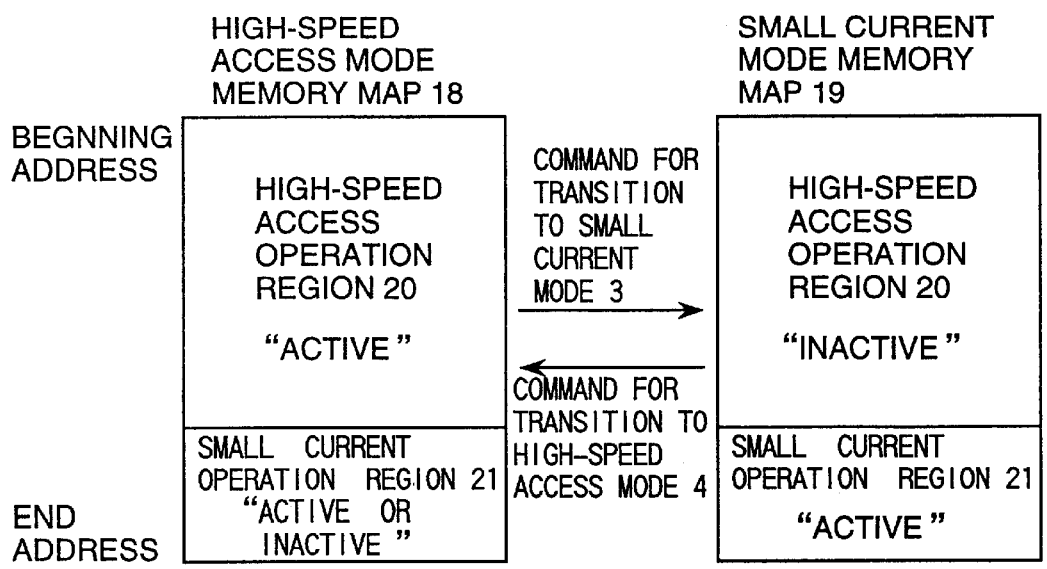
FIG. 9 is a diagram which conceptually shows another feature in the operation of a memory according to the present invention.

FIG. 9 is a diagram which conceptually shows another feature of the operation of a memory according to the present invention. In this embodiment, the memory has a high-speed access operation region 20 in which a memory access is executed at a high-speed, but in which the amount of current dissipation is large, and a small current operation region 21 in which a memory access is executed at a lower-speed than the speed in the region 20, but in which the amount of current dissipation is small. Moreover, the memory has a function such that, in accordance with a requirement designated from the outside of the memory, if the high-speed access operation is designated, the high-speed access operation region 20 is set to an active state (readable and writable state), and the small current operation region 21 is set to an active state or an inactive state (only date keeping state), and if the small current operation is designated, the high-speed access operation region 20 is set to an in active state, and only the small current operation region 21 is set to an active state.

That is, in this example of memory control according to the present invention, a high-speed access operation region 20 and a small current operation region 21 are provided. Furthermore, a high-speed access mode memory map 18 and a small current mode memory map 19 are provided for the memory regions 20 and 21. Moreover, the memory includes a means for switching the operation states in the memory so that if a high-speed access operation is designated, the high-speed access operation region 20 is set to an active state, as indicated in the high-speed access mode memory map 18, and the microcomputer uses the high-speed access operation region 20, and if a small current operation is designated, the small current operation region 21 is set to an active state, as indicated in the small current mode memory map 19, and the microcomputer uses only the small current operation region 21. Hereupon, the small current operation region 21 can be set either as the upper or the lower part of the address space of the memory.

In the composition of the memory according to this embodiment, since the memory includes a small current operation region, even if the memory is operated in a high-speed mode, the amount of current dissipation amount is smaller in comparison with the composition of the memory in which the whole region of the memory is operated in a high-speed mode. On the other hand, if the memory is operated in a low-speed mode, since the high-speed access operation region is set to an inactive mode, the amount of current dissipation can be further reduced.

As a mode switching means, a register means including a memory for input/output of port addresses, memory addresses and so forth, an input port, and an output port, (referred to as the register, etc.) may be used. By writing mode designation data into the register, etc., the division of the memory, the mode (high-speed access mode or small current mode) arrangement in memory blocks determined by the division, etc., can be designated. Furthermore, by providing a means for reading the contents of the register, etc., it is possible to detect the present mode arrangement in the memory blocks in the memory.

Moreover, a microcomputer system, including a microcomputer and a memory according to the present invention, may be composed so that the whole of the microcomputer system is operated in a high-speed mode during the writing of data into a register, etc. and is operated in a low-speed mode during the reading of data out of the register, or vice versa.

Further, commands for switching an operation mode between the high-speed mode and the small current mode may be embedded into instruction codes for the microcomputer system.

Figure 10:
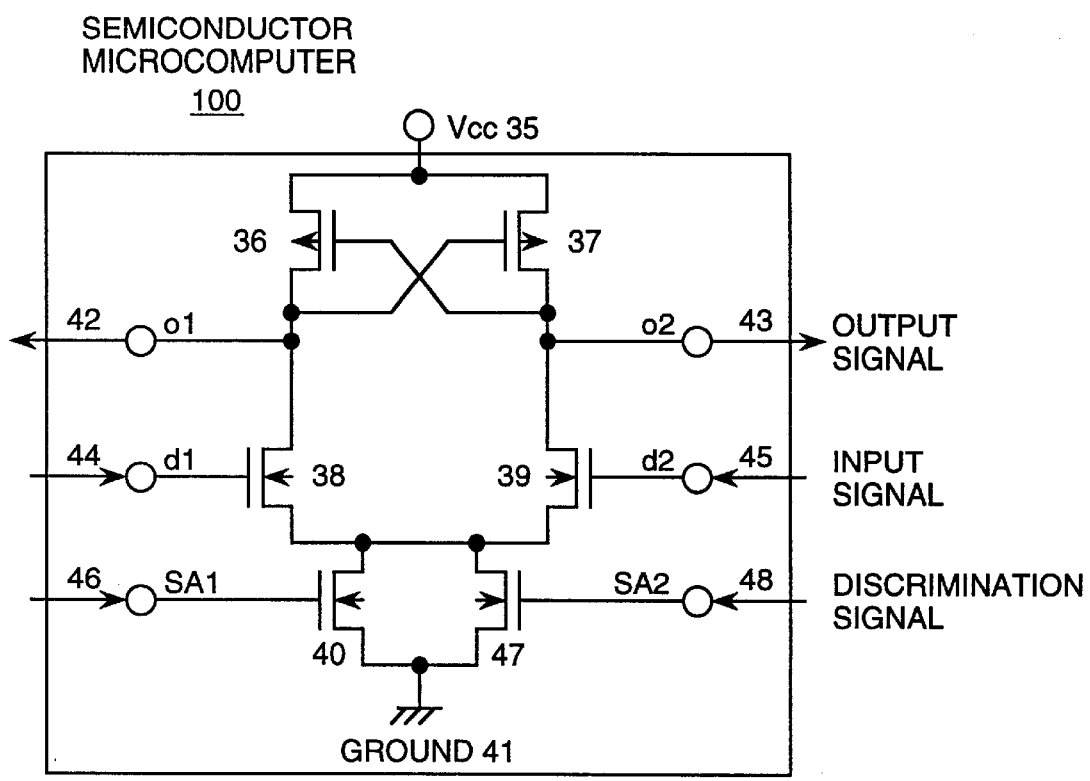
FIG. 10 is a schematic circuit diagram which shows a sense amplifier according to the present invention.

FIG. 10 is a diagram which shows an example of a sense amplifier according to the present invention, which represents an example of an amplifier in which the amount of current dissipated in the amplifier can be changed by increasing the signal output speed in amplifying an output signal from the memory. In this figure, elements 35–46 are the same as those used in a conventional sense amplifier, and elements 47 and 48 are newly added in accordance with the invention. The source electrodes of the first PMOS 36 and the second PMOS 37 are connected to a power supply Vcc 35, and the drains of the first PMOS 36 and the first NMOS 38, and the gate electrode of the second PMOS 37, are connected to a positive-phase output terminal 01 from which an output signal 42 is output. The drain electrodes of the second PMOS 37 and the second NMOS 39, and the gate electrode of the first PMOS 36, are connected to a reverse-phase output terminal 02 from which an output signal 43 is output.

Moreover, the sources of the first NMOS 38 and the second NMOS 39, and the drains of the third NMOS 40 and the fourth NMOS 47, are connected to each other, while the sources of the third NMOS 40 and the fourth NMOS 47 are connected to ground. A positive-phase input signal 44 is input to the gate electrode of the first NMOS 38 via a positive-phase input terminal d1 connected to the gate of the first NMOS 38, and a reverse-phase input signal 45 is input to the gate electrode of the second NMOS 39 via a reverse-phase input terminal d2 connected to the gate electrode of the second NMOS 39. A sense amplifier enabling input signal 46 is input to the gate electrode of the third NMOS 40 via a terminal SA1 connected to the gate electrode of the third NMOS 40, and a sense amplifier enabling input signal 48 is input to the gate electrode of the fourth NMOS 47 via a terminal SA2 connected to the gate electrode of the fourth NMOS 47.

That is, by using the discrimination signal, both of the signals 46 and 48 are used as sense amplifier enabling signals, if the memory is operated in the high-speed access mode, where the level of the signal 48 is set to "L" and only the signal 46 is used as a sense amplifier enabling signal if the memory is operated in the small current mode. By the above-mentioned composition of the sense amplifier, the amount of current dissipated in the memory when operated in the small current mode can be reduced in comparison with the amount of current dissipation in the memory when operated in the high-speed access mode.

Figure 11:
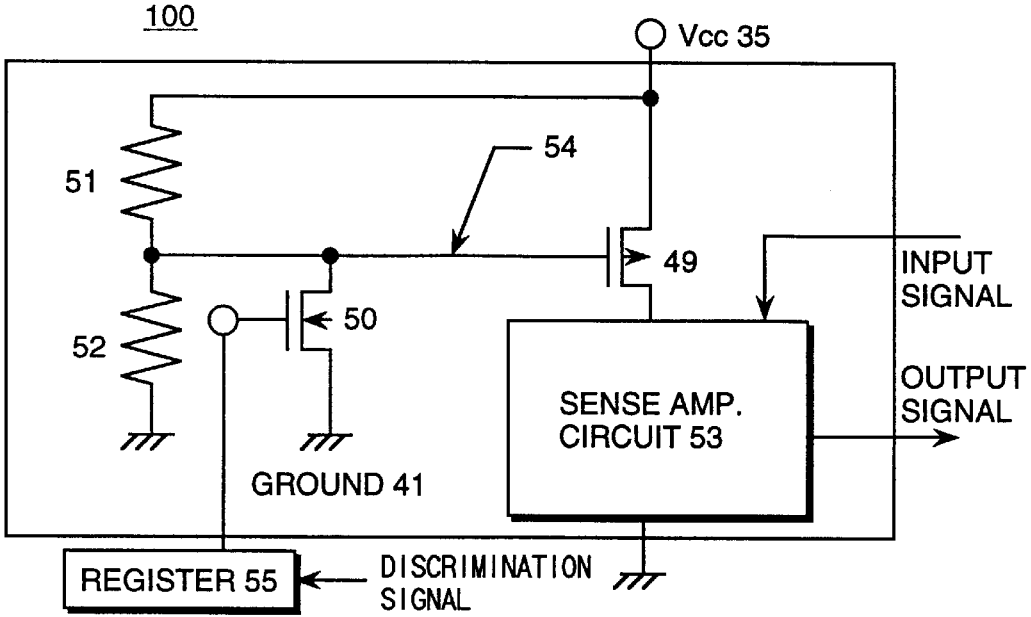
FIG. 11 is a schematic circuit diagram which shows another form of a sense amplifier according to the present invention.

FIG. 11 is a diagram which shows another embodiment of a sense amplifier according to the present invention. The sense amplifier in this embodiment is another example of an amplifier in which the amount of current dissipated in the amplifier can be changed by increasing the signal output speed in amplifying an output signal from the memory.

As seen in FIG. 11, the source electrode of PMOS 49 is connected to a power supply Vcc 35, and the drain electrode of PMOS 49 is connected to a sense amplifier circuit 53 as a power source of the circuit 53. One terminal of a first resistor 51 is connected to the power source Vcc 35, and the other terminal of the first resistor 51, one terminal of a second resistor 52, the gate electrode of PMOS 49 and the drain electrodes of NMOS 50 are connected to each other, wherein a current control signal is output from the drain electrode of NMOS 50. The other terminal of the second resistor 52 and the source electrode of the NMOS 50 are connected to ground 41, and the gate electrode of the NMOS 50 is connected to a mode setting register 55, which is connected to receive a discrimination.

In the above-mentioned sense amplifier circuit, by using the discrimination signal 82 stored in the mode setting register 55, if the content of the register 55 is the first value (or the first potential), for example, "0" (indicating the small current mode), since the NMOS 50 is turned off and the potential level of the current control signal 54 becomes an intermediate potential level determined according to the resister ratio of the first resister 51 and the second resister 52, the ON resistance of the PMOS 49 becomes large, and the current flow in the sense amplifier 53 becomes small. On the other hand, if the content of the register 55 is the second potential, for example, "1" (indicating the high-speed access and large current mode), since the NMOS 50 is turned on and the potential level of the current control signal 54 becomes ground level, the ON resistance of the PMOS 49 becomes minimum, and the current flow in the sense amplifier 53 becomes maximum. As mentioned above, the sense amplifier 53 operates in a low-speed and small current state during the small current mode of the memory, and in high-speed and large current state during the high-speed access mode of the memory.

In the memory and the microcomputer disclosed in the foregoing embodiments, a single memory unit, a memory system, a semiconductor memory, a memory chip, etc., can be used as the memory, and a microcomputer system, a single chip microcomputer, etc., can be used as the microcomputer.

In accordance with the present invention, two operational modes, including a high-speed access mode and a small current mode, are available for the memory, and the memory includes means for designating in which one of the two operational modes each memory region is to be operated, as well as a means for switching between the two operational modes. Therefore, when it is not necessary to operate the memory at a high speed, the amount of current dissipation can be reduced. Furthermore, it is possible to operate the memory so that the amount of current dissipated in the memory is as required and is a minimum.

Thus, it is possible for the power source to be downsized, and consequently, in a battery driven system, the lifetime of the batteries can be maximally extended and the number of batteries to be used can be reduced.

What is claimed is:

1. A memory having means for providing two operational modes, including a high-speed access mode in which a current dissipation amount is large, but a high-speed access is possible, and a small current mode in which an access speed is lower than that in said high-speed access mode, but a current dissipation amount is small, wherein said memory is divided into a plurality of memory blocks; and a register for designating one of said operational modes to each memory block, each bit of said register corresponding to a predetermined one of said plurality of said blocks, and a value of each bit being set by an instruction signal given to said memory and corresponding to one of said two operational modes, wherein one of said two operational modes is designated to each memory block corresponding to the set value of a corresponding bit of said register.

2. A memory according to claim 1, further including means for outputting a discrimination signal to indicate the modes selected by for each of said memory blocks.

3. A memory according to claim 1, wherein the register stores a "0" to designate the small current mode for a corresponding one of said memory blocks, and wherein the register stores a "1" to designate the high speed access mode for a corresponding one of said memory blocks.

* * * * *